United States Patent
Roskind

(10) Patent No.: US 7,228,417 B2
(45) Date of Patent: Jun. 5, 2007

(54) SIMPLE SECURE LOGIN WITH MULTIPLE-AUTHENTICATION PROVIDERS

(75) Inventor: James Roskind, Redwood City, CA (US)

(73) Assignee: America Online, Inc., Dulles, VA (US)

(*) Notice: Subject to any disclaimer, the term of this patent is extended or adjusted under 35 U.S.C. 154(b) by 892 days.

(21) Appl. No.: 10/291,281

(22) Filed: Nov. 7, 2002

(65) Prior Publication Data

US 2003/0163737 A1 Aug. 28, 2003

Related U.S. Application Data

(63) Continuation-in-part of application No. 10/086,104, filed on Feb. 26, 2002.

(51) Int. Cl.
*H04L 9/00* (2006.01)
*H04L 9/32* (2006.01)

(52) U.S. Cl. ............. 713/168; 713/150; 713/176; 713/182; 726/2; 726/5; 380/255

(58) Field of Classification Search ........ 713/150, 713/182–185, 168, 176; 726/2–3, 5, 8, 9; 380/255; 709/219, 225

See application file for complete search history.

(56) References Cited

U.S. PATENT DOCUMENTS

| | | | | |
|---|---|---|---|---|
| 5,210,795 | A | 5/1993 | Lipmer et al. | 380/23 |
| 5,349,642 | A | 9/1994 | Kingdon | 380/25 |
| 5,581,616 | A | 12/1996 | Crandall | 380/28 |
| 5,633,931 | A | 5/1997 | Wright | 380/25 |
| 5,659,616 | A | 8/1997 | Sudia | 380/23 |
| 5,684,951 | A | 11/1997 | Goldman et al. | 395/188.01 |
| 5,768,373 | A | 6/1998 | Lobstroh et al. | 380/4 |

(Continued)

FOREIGN PATENT DOCUMENTS

EP 667 998 10/1999

(Continued)

OTHER PUBLICATIONS

*Password Files*; T.J. Pope; Dr. Dobb's Journal; Jan. 1996.

(Continued)

*Primary Examiner*—Kim Vu
*Assistant Examiner*—Yin-Chen Shaw
(74) *Attorney, Agent, or Firm*—Michael A. Glenn; Glenn Patent Group

(57) ABSTRACT

A secure distributed single-login authentication system comprises a client and a server. The client collects a user name and password from a user and tests that user name and password at a variety of potential authentication servers to check where the login is valid. It combines the password with a time varying salt and a service specific seed in a message digesting hash and generates a first hash value. The client sends the hash value along with the user name and the time varying salt to a currently selected server. The server extracts the user name and looks up an entry under the user name from the selected server's database. If an entry is found, it retrieves the password and performs the same hash function on the combination of the user name, the service specific seed, and the retrieved password to generate a second hash value. Then, it compares two hash values. If these two values match, the user is authenticated. In this way, the system never sufficiently reveals the password to authentication agents that might abuse the information.

11 Claims, 6 Drawing Sheets

U.S. PATENT DOCUMENTS

| | | | | |
|---|---|---|---|---|
| 5,774,552 | A | * | 6/1998 | Grimmer .................... 713/156 |
| 5,799,088 | A | | 8/1998 | Raike .......................... 380/30 |
| 5,805,703 | A | | 9/1998 | Crandall ...................... 380/30 |
| 5,815,665 | A | | 9/1998 | Teper et al. ........... 395/200.59 |
| 5,841,865 | A | | 11/1998 | Sudia ........................... 380/21 |
| 5,841,871 | A | * | 11/1998 | Pinkas ........................ 713/155 |
| 5,872,849 | A | | 2/1999 | Sudia ........................... 380/49 |
| 5,892,828 | A | | 4/1999 | Perlman ....................... 380/25 |
| 5,995,624 | A | | 11/1999 | Fielder et al. ................ 380/25 |
| 6,009,177 | A | | 12/1999 | Sudia ........................... 380/25 |
| 6,049,610 | A | | 4/2000 | Crandall ....................... 380/30 |
| 6,085,321 | A | | 7/2000 | Gibbs et al. ................ 713/170 |
| 6,091,835 | A | | 7/2000 | Smithies et al. ............ 382/115 |
| 6,094,659 | A | * | 7/2000 | Bhatia ..................... 707/104.1 |
| 6,094,721 | A | | 7/2000 | Eldrisge et al. ............. 713/168 |
| 6,161,181 | A | | 12/2000 | Haynes, III et al. ........ 713/170 |
| 6,185,316 | B1 | | 2/2001 | Buffam ....................... 382/115 |
| 6,189,096 | B1 | | 2/2001 | Haverty ...................... 713/155 |
| 6,199,052 | B1 | | 3/2001 | Mitty et al. ................... 705/75 |
| 6,212,635 | B1 | | 4/2001 | Reardon ..................... 713/165 |
| RE37,178 | E | | 5/2001 | Kingdon ...................... 380/25 |
| 6,259,789 | B1 | | 7/2001 | Paone ......................... 380/28 |
| 6,282,295 | B1 | | 8/2001 | Young et al. ............... 380/286 |
| 6,285,760 | B1 | | 9/2001 | Crandall ...................... 380/30 |
| 6,298,383 | B1 | * | 10/2001 | Gutman et al. ............. 709/229 |
| 6,298,445 | B1 | | 10/2001 | Shostack et al. ............ 713/201 |
| 6,304,915 | B1 | | 10/2001 | Nguyen et al. ............. 709/250 |
| 6,307,935 | B1 | | 10/2001 | Crandall et al. ............. 380/28 |
| 6,421,768 | B1 | | 7/2002 | Puroura ....................... 711/164 |
| 6,662,300 | B1 | * | 12/2003 | Peters ........................ 713/182 |
| 6,732,101 | B1 | * | 5/2004 | Cook ........................... 707/10 |
| 6,819,766 | B1 | * | 11/2004 | Weidong .................... 380/277 |
| 6,959,336 | B2 | * | 10/2005 | Moreh et al. ............... 709/229 |
| 6,996,718 | B1 | * | 2/2006 | Henry et al. ................ 713/182 |
| 7,024,690 | B1 | * | 4/2006 | Young et al. ................... 726/5 |
| 2002/0184507 | A1 | * | 12/2002 | Makower et al. ........... 713/182 |
| 2003/0131266 | A1 | * | 7/2003 | Best et al. .................. 713/202 |
| 2003/0135507 | A1 | * | 7/2003 | Hind et al. ................. 707/100 |

FOREIGN PATENT DOCUMENTS

| | | | |
|---|---|---|---|
| EP | 1 076 279 | | 2/2001 |
| EP | 1 081 914 | | 3/2001 |
| EP | 1 089 516 | | 4/2001 |
| EP | 739 560 | | 6/2001 |

OTHER PUBLICATIONS

*Sign on to Streamlined Security*; J.R. Vacca; Datamation; Sep. 15, 1994.

*Better Login Protocols for Computer Networks*; D. de Waleffe, and J.J. Quisquarter; Computer Security an Industrial Cryptography; May 1991.

*A Security Architecture for Computational Grids*; Ian Foster, Carl Kesselman, Gene Tsudik, and Steven Tuecke.

*SESAME V2 Public Key and Authorisation Extensions to Kerberos*; P,V. McMahon.

*Efficient Kerberized Multicast in a Practical Distributed Setting*; Giovanni Di Crescenzo.

*A Flexible Distributed Authorization Protocol*; Jonathan T. Troslte, and B. Clifford Neuman.

*Krypto Knight Authentication and Key Distribution System*; Refik Molva, Gene Tsudik, Els Van Herreweghen, and Stefano Zatti; Aug. 24, 1993.

*On Selectable Collisionful Hash Functions*; S. Bakhtiari, R. Safavi-Naini, and J. Pieprzyk.

*RFC 1423—Privacy Enhancement for Internet electronic Mail: Part III: Algorithms, Modes, and Identifiers*; D. Balenson; Feb. 1993.

*Secure Electronic Payment Systems, Secure Electronic Transactions (SET)*; Burton Filstrup.

*Secure Data Collection With Updates*; S. Loureiro, R. Molva, and A. Pannetrat; Electronic Commerce Research; Feb.-Mar. 2001.

*Message Digest 5 and the Authentication in IPv6*; Wang Gui-Zhu, Li Jin-Sheng, and Hong Pei-Lin; Mini-Micro System; Jan. 2001.

*A Study of One-Time Password System Based on Message Digest*; Liu Yuyan, and Luo Junzhou; 5th International Conference for Young Computer Scientists; 1999.

*One-Way Hash Functions*; B. Schneier; Dr. Dobb's Journal; Sep. 1991.

*The MD4 Message Digest Algorithm*; B.S, Kaliski Jr.; Advances in Cryptology; 1991.

* cited by examiner

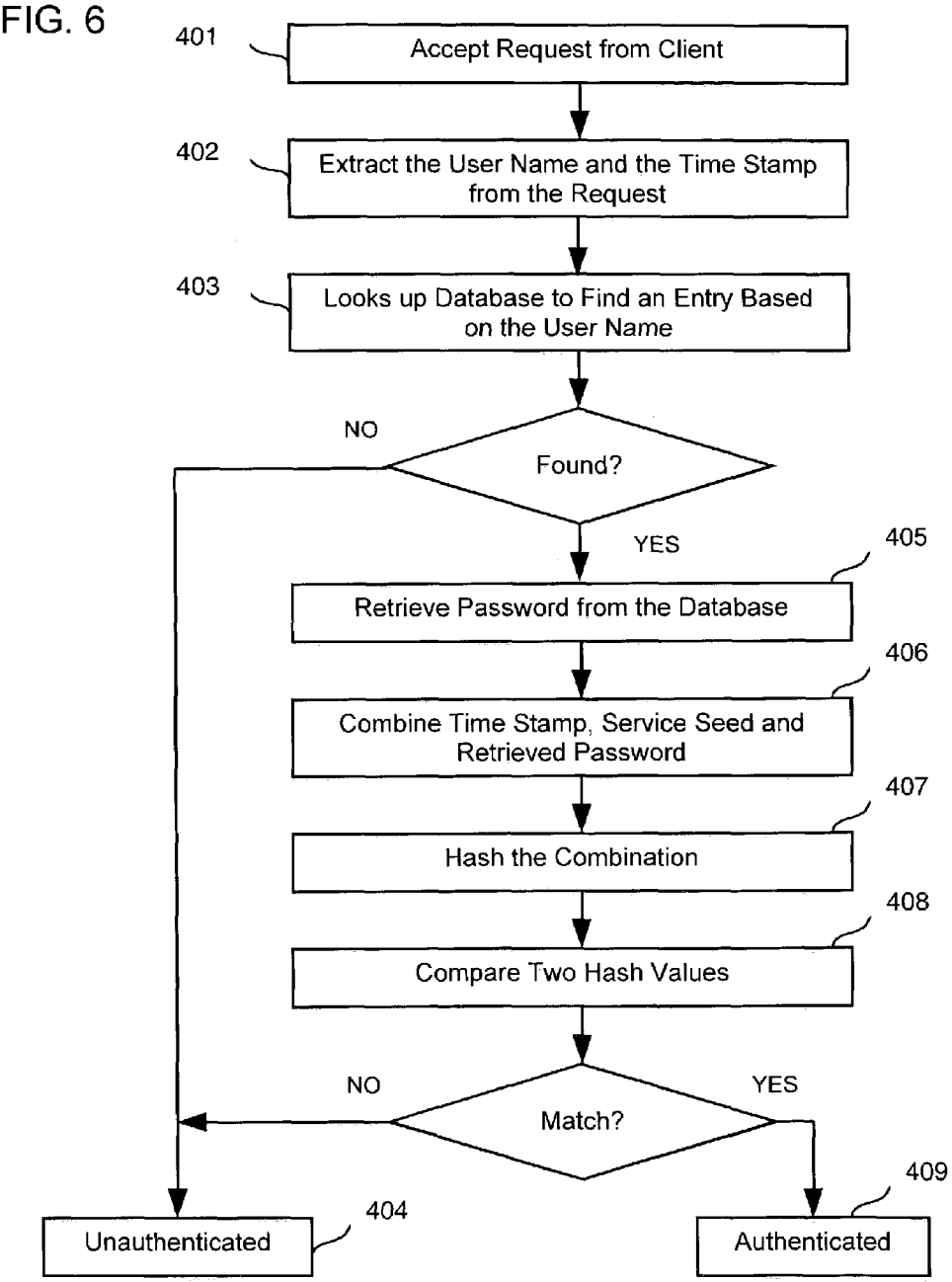

SIMPLE SECURE LOGIN WITH MULTIPLE-AUTHENTICATION PROVIDERS

CROSS-REFERENCE TO RELATED APPLICATIONS

This application is a Continuation-in-Part U.S. patent application Ser. No. 10/086,104 filed Feb. 26, 2002.

TECHNICAL FIELD

This invention relates generally to user authentication technology used in an Internet-based distributed network system. More particularly, this invention relates to a system and method for authenticating a user without exposing his password to any participant of a network with multiple-authentication providers.

BACKGROUND OF THE INVENTION

The explosive growth of the Internet is changing the ways in which we communicate, conduct business, and pursue entertainment. A few years ago, electronic commerce (E-commerce) was just an interesting concept. By 1999, however, it had become the hottest thing around. Today, not only are consumers buying an enormous volume of goods or services over the Internet, but the business-to-business E-commerce has taken off as well.

The basic cell of E-commerce is an electronic transaction, which requires a buyer or user fills out one or more electronic forms on screen and click a button named "send", "buy" or "submit", etc. To complete such an electronic transaction, a user has to go through an authentication process. In other words, the user must provide the seller or service provider with some information such as his or her personal identification, contact information, or even financial information. The authentication process may take from several minutes to hours. Since each seller or service provider maintains its own authentication server and database, millions of seller and service providers might share thousands of millions of consumers or users. Some of the consumers or users might be required to go through the same or similar authentication process again and again if they have transactions with many sellers or service providers. This repetitive authentication not only wastes consumers' precious time, but also burdens the sellers or service providers because they have to expand their databases to keep detailed authentication information for a growling number of users. This situation brings forth a technical need to create a universal, unified single-login infrastructure wherein a specific user may be authenticated once for all and the authentication result is widely recognized by a large number of sellers or service providers.

In responding to that need, several approaches have been developed. For example, Microsoft Corporation has introduced a ".NET Passport" single sign-in system. With ".NET Passport", a user doesn't need to register a member name and password at each new site he or she visits. The user may simply use his or her e-mail address and password that registered as his or her ".NET Passport" to sign in to any participating site or service. The information the user registers with ".NET Passport" is stored online, securely, in the ".NET Passport" database as the user's ".NET Passport profile." When the user sign in to a ".NET Passport" participating site by typing his or her e-mail address and password in the ".NET Passport" sign-in box, ".NET Passport" confirms that (1) the e-mail address he or she typed is registered with ".NET Passport", and (2) the password he or she typed is correct. ".NET Passport" then notifies the site that the user has provided valid "sign-in credentials", and he or she is given access to the participating site. Once the user signs in to one ".NET Passport" participating site during an Internet session, he or she can sign in to others simply by clicking the ".NET Passport" sign-in button on each site.

Another example is America Online Inc.'s "Screen Name Service" system, which provides free service allowing anyone with a "Screen Name" to easily and securely register at a variety of Web sites. Similar to Microsoft's ".NET Passport" system, the "Screen Name Service" eliminates a user's need to remember multiple names and passwords for all the places he or she visits on the Web. With the "Screen Name Service" system, each user has a "My Profile", which stores the user's personal information used to make registering at sites across the Web simple and secure. When the user registers at a participating Web site using the service, he or she has the opportunity to choose which fields of information stored by AOL, if any, he or she would like to share with that site. No information will be shared with any Web site without the user's explicit permission. When the user agrees to share certain information with a participating site, that information is conveyed to the Web site at which he or she is registering. Another feature is that the user is provided with a "My Site List", which is an effective way to manage personal information because it shows the user with which sites he or she has registered with using the service. The user can view the privacy policy of a site to see how it uses information it knows about the user. The user can also decide if he or she would like to be signed into the site without being prompted and if the site should be updated with information if "My Profile" changes.

The common characteristic of these approaches is that they implement a centralized solution for authentication and authentication information management. Undoubtedly, the centralized solution may overcome the repetitive authentication and repetitive storage problems that exist in the scattered, disorganized situation.

However, the centralized solution has three major disadvantages. First, in a centralized authentication system, because all the login requests go to a central authentication server, the traffic to the server could be very heavy, the requirements for the process capability and database size could be predictably high, and the authentication process would be very slow when the number of requests is overwhelmed for the server. Second, in case that the central authentication system fails, all the authentication requests would be suspended. Third, the central authentication service provider could monitor the participating sites' login rates and a site which hosts a user's login page could monitor the user's login information. This situation is surely disliked by most of the participants.

Our invention disclosed in the application Ser. No. 10/086,104 filed Feb. 26, 2002 provides a solution to have each authentication carried out at one of participating servers and have the authentication result distributed and cached all over the network of the participating servers so that the authentication results cannot be centrally monitored and even a site which hosts a user's login page cannot monitor a user's login information.

The invention provides a solution to guarantee the security of the distributed single-login authentication systems. In a "global single-login user name/password" situation, the user could mistakenly send his password to an unintended recipient that might abuse the information. For example, if the user attempted to type joe@aol.com but mistakenly typed joe@alo.com instead, and when he correctly entered his password and clicked login, the "alo.com" server would receive the user's password. In a "user name/password" situation, the authentication system does not know which authentication server is the correct one. It has to test a number of servers by forwarding each of the tested servers the user name and the password. Therefore, the more servers tested during the process, the more servers know the user's password. If any of the recipients abuses the information, it may cause irreparable harm to the user. This "leaking" of login information is generally unacceptable from a security perspective.

SUMMARY OF INVENTION

The invention disclosed herein comprises a system and method of providing secure single-login service with distributed multiple-authentication providers.

In the first preferred embodiment, the secure distributed authentication system comprises a client portion and a server portion. The client portion collects a user's regular user name and password and tests that user name and password at a variety of potential authentication servers to check where the login is valid. It combines the password with a time varying salt and a service specific seed in a message digesting (MD) hash and generates a first hash value. The client sends the hash value along with the user name and the time varying salt to a currently selected server. The server portion extracts the user name and looks up an entry under the user name from the authentication server's database. If an entry is found, it retrieves the password and performs a same hash function on the combination of the user name, the service specific seed and the retrieved password to generate a second hash value. Then, it compares two hash values. If these two values match, the user is authenticated. In this way, the system never reveals the password to each tested authentication servers or any accidental recipient that might abuse the information.

The authentication process according to the first preferred embodiment includes the following steps:

(a) the client takes and parses an entered user name and password;

(b) generates a time stamp; iterates a list of authentication servers;

(c) iterates a list of authentication servers;

(d) combines the time stamp, the password and a service specific seed unique to an authentication server selected from the list;

(e) applies a hash algorithm to the combination to generate a first hash value;

(f) finds an IP address for the currently selected authentication server;

(g) sends a data packet to the selected authentication server, wherein the data packet includes the first hash value, the user name and the time stamp;

(h) extracts the first hash value, the user name and the time stamp from the data packet received from the client;

(i) checks whether an entry under the user name is available in the selected authentication server's database;

(j) if no entry under the user name is found, then returns a failure message to the client and repeats steps (b) to (g) for a next selected authentication server;

(k) if an entry under the user name is found, then retrieves the user's password;

(l) combines the time stamp, the retrieved password and the service specific seed unique to the selected authentication server;

(m) applies the hash algorithm to the combination from Step (l) to generate a second hash value;

(n) compares the first hash value and the second hash value;

(o) if these two hash values do not match, then returns a failure message to the client and repeats steps (b) to (g) for a next selected authentication server;

(p) if these two hash values do match, then returns a successful authentication message to the client; and (q) when the entire list has been tested and no one authenticates the user, then results in authentication failure.

Note that Steps (a)–(g) are performed in the client software and Steps (h)–(p) are performed at each authentication service (i.e. server side software) before Steps (c) iterates to the next authentication service.

In the second equally preferred embodiment, the secure distributed authentication system comprises a client portion and a server portion. The client portion collects a user's global user identification (GUID) and password. It combines the password with a time varying salt and a service specific seed in a message digesting (MD) hash and generates a first hash value. The client extracts the regular user name and the domain portion from the GUID. By looking up a local mapping list or a domain name system (DNS), the client obtains an Internet Protocol (IP) address for the authentication server identified by the domain portion. Then, it sends the hash value along with the user name and the time varying salt to the authentication server. The server portion extracts the user name and looks up an entry under the user name from the server's database. If an entry is found, it retrieves the password and performs a same hash function on the combination of the user name, the retrieved password and the service specific seed to generate a second hash value. Then, it compares two hash values. If these two values match, the user is authenticated. In this way, the system does not reveal the password to any accidental recipients.

The authentication process according to the second preferred embodiment includes the following steps:

(a) The client parses an entered GUID and password;

(b) generates a time stamp;

(c) extracts the user name from the GUID;

(d) extracts the domain portion from the GUID;

(e) combines the password and a service specific seed unique to the target authentication server identified by the domain portion and hash the combination by applying a hash algorithm;

(f) combines the result of (e) with the time stamp to generate a first hash value;

(g) appends a unique domain name to the domain portion to form a fully qualified domain name (FQDN) for the target authentication server;

(h) looks up the FQDN from a local mapping list to obtain an IP address representing the target authentication server;

(i) if Step (h) fails, looks up the FQDN in a domain name system (DNS) to obtain an IP address representing the target authentication server;

(j) sends a data packet to the target authentication server, wherein the data packet includes the first hash value, the user name and the time stamp;

(k) extracts the first hash value, the user name and the time stamp from the data packet received from the client;

(l) checks whether an entry under the user name is available in the target authentication server's database;

(m) if no entry under the user name is found, then returns a failure message to the client;

(n) if an entry under the user name is found, then retrieves the user's password;

(o) combines the time stamp, the retrieved password and the service specific seed unique to the target authentication server;

(p) applies the hash algorithm to the combination from Step (o) to generate a second hash value;

(q) compares the first hash value and the second hash value;

(r) if these two hash values do not match, then returns a failure message to the client; and (s) if the these two hash values do match, then returns a successful authentication message to the client.

The process may further include a step to automatically map an unrecognized FQDN to a default server for authentication.

BRIEF DESCRIPTION OF THE DRAWINGS

FIG. 6 is a flow chart illustrating an exemplary authentication process performed in the server portion according to the invention.

DETAILED DESCRIPTION

Figure 1:
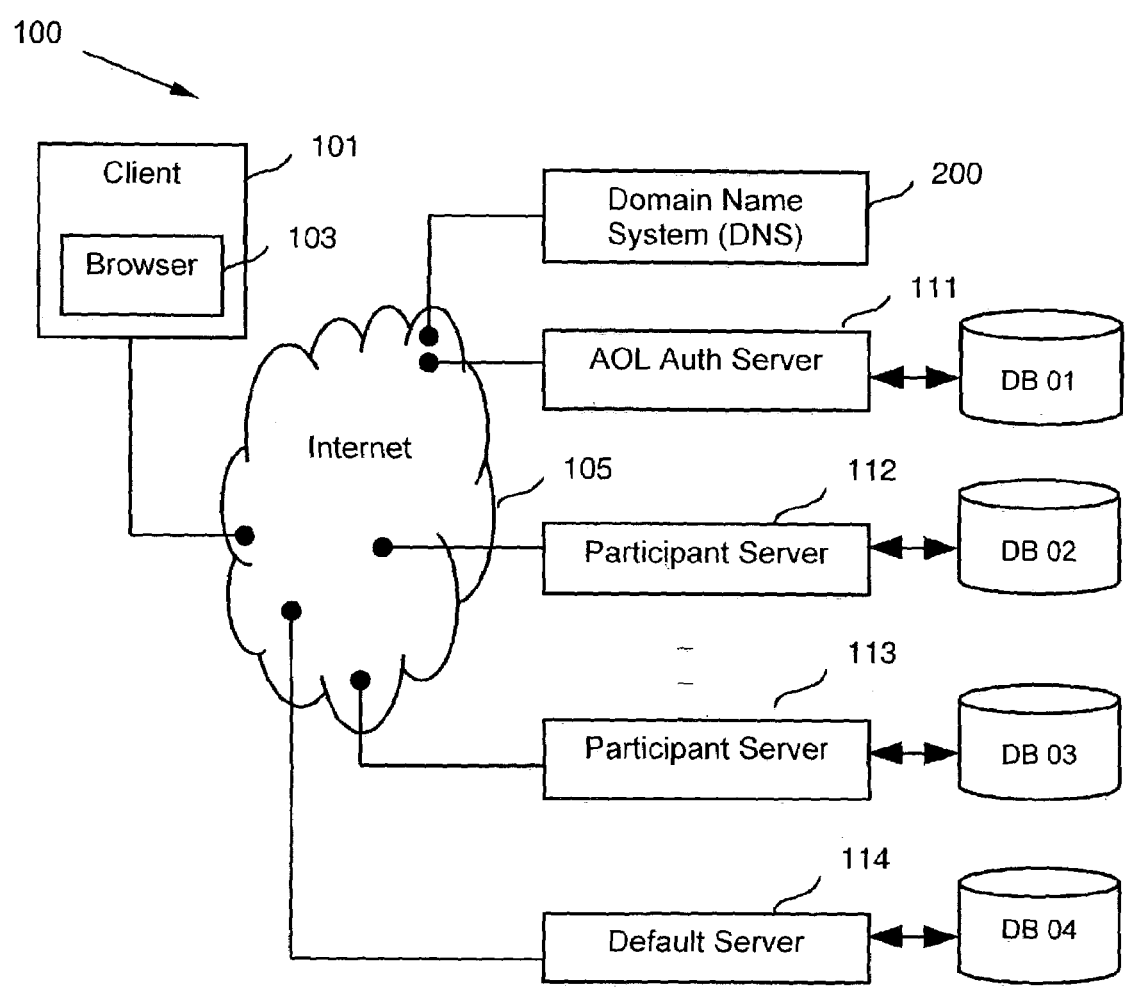
FIG. 1 is a block diagram illustrating an exemplary network that facilitates a distributed authentication service according to the invention.

FIG. 1 is a block diagram illustrating an exemplary network 100, which provides distributed authentication service among a global authentication federation. The MCN network includes at least one client, e.g. client 101, and a number of authentication servers, e.g. servers 111~113, which are communicatively connected via the Internet 105.

Each client may include a browser 103 which displays an HTML file. The HTML facilitates a number of functions, which are typically implemented in JavaScript. Alternatively, the client may be implemented as a standalone application for managing the authentication process.

Each authentication server represents a participant of the global authentication federation and has an associated database, e.g. DB 01~DB 03, which caches its registered users' information and any authentication token from other participating authentication servers.

The clients and the authentication servers can access a local domain name server, which is one of many domain name servers coupled in a domain name system (DNS).

The distributed authentication system embodied in the MCN network 100 according to the invention includes a client portion, which runs on a client device, and a server portion, which runs on a participating server of the global authentication federation.

Figure 2:
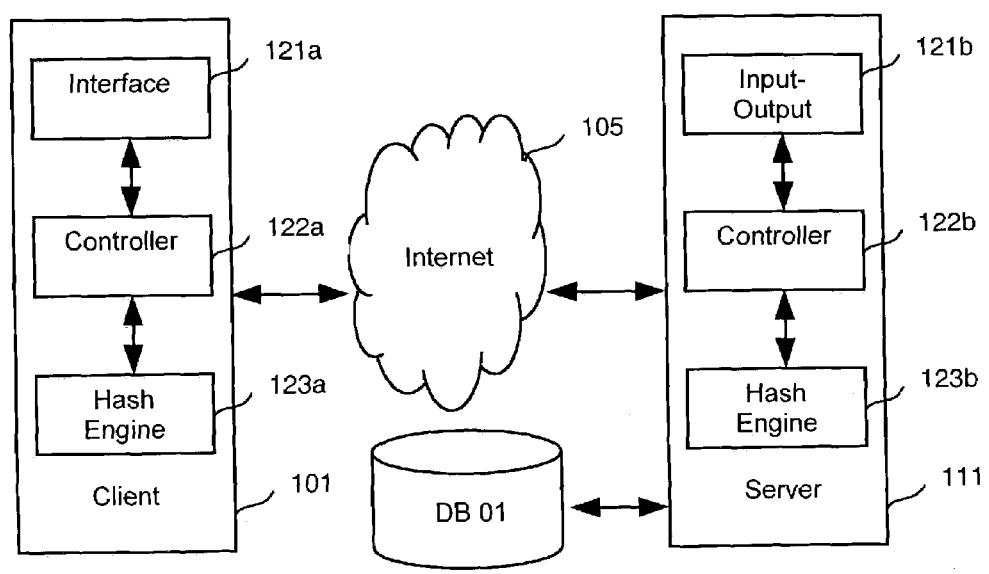
FIG. 2 is a schematic diagram illustrating a simplified network including a client and an authentication server.

FIG. 2 is a schematic diagram illustrating a simplified MCN network including a client 101 and an authentication server 111. Typically, the client 101 includes (1) a user interface 121a, which enables a user to login by entering his user ID and password; (2) a central control piece 122a, which implements client logic controlling the authentication process complying with the client portion of the authentication system; and (3) a message digest algorithm computing engine 123a, which performs a one-way hash function.

The authentication server 111 includes (1) an input/output 121b, which is used to receive requests and send back replies; (2) a controller 122b, which implements the server's logic controlling the authentication process complying with the server portion of the authentication system; and (3) a message digest algorithm computing engine 123b, which performs the same one-way hash function as that performed in the client portion. In addition, the server 111 is communicatively coupled to a database DB 01, which maintains its registered users' detail information including their passwords.

The hash function performed by the hash engines 123a and 123b is a mathematical function that maps values from a larger domain into a smaller range; in particular, they apply such a function to a password combined with certain seeds such as a time-specific seed or/and service-specific seed. The hash process is a one-way process, in which the hash engine applies a cryptographically secure hash algorithm to a combination of various parameters and generates a hash value. It is almost impossible to reverse the process and deduce the password.

The hash engines 123a and 123b may take advantage of an operation known as message digesting (MD). An MD algorithm takes as input a message of arbitrary length and produces as output a 128 bit fingerprint or message digest of the input. It is computationally infeasible to produce two messages having the same message digest, or to produce any message having a given pre-specified target message digest. There are a number of message digesting algorithms available for use, some of which are provided by Rivest, Shamir and Associates (RSA). RSA message digesting algorithms have different versions such as MD2, MD4 and MD5. Other algorithms, such as Secure Hash Algorithm (SHA) which is a NIST standard, are also available in the marketplace.

The MD5 algorithm is usually used in digital signature application, where a large file must be compressed in a secure manner before being encrypted with a secret key under a public crypto-system such as RSA. For details about MD5 algorithm, see R. Rivest, *The MD5 Message-Digest Algorithm*, RFC 1321, MIT Laboratory for Computer Science and RSA Data Security, Inc.

Although an MD5 or its equivalent is preferably used in the embodiments described below, MD2 and MD4 digesting algorithm or other functionally equivalent algorithms can also be used in the scheme of the invention.

Process Performed by the Client Portion

In one preferred embodiment, the client portion of the authentication system takes the user's regular user name and password and maintain a mapping list of the fully qualified domain names (FQDN) for all MCN participants and their Internet Protocol (IP) addresses.

Figure 3:
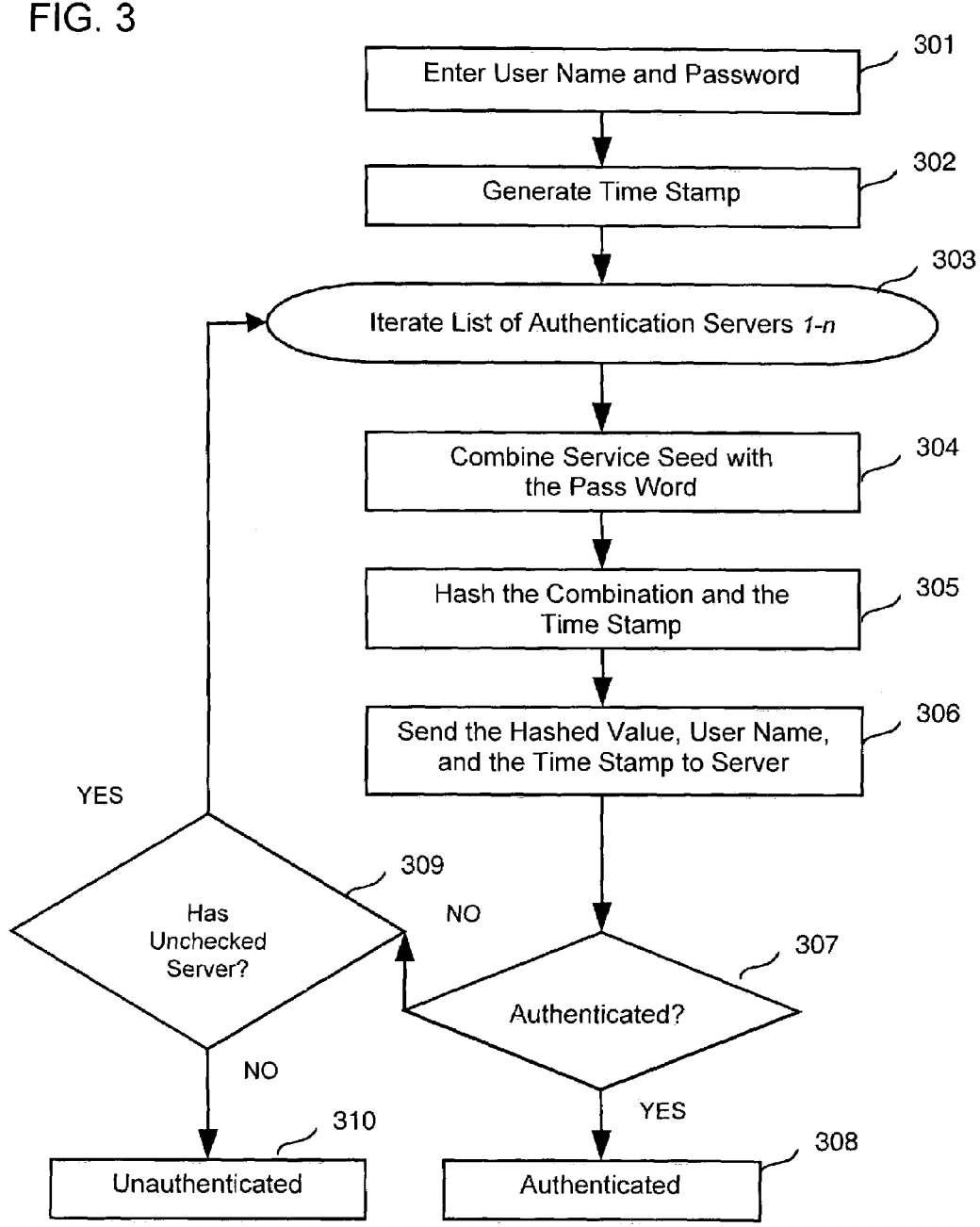
FIG. 3 is a flow chart illustrating an exemplary authentication process performed by the client portion according to the invention.

FIG. 3 is a flow chart illustrating an exemplary authentication process 300 performed by the client portion according to the invention. The process includes the steps of:

Step 301. The client 101 takes and parses the user name and password entered by a user in the login page.
Step 302. Generates a time varying salt such as a time stamp.
Step 303. Iterates a list of authentication servers from 1 to n to select the right authentication server.
Step 304. Combines the user's password with a service-specific seed unique to a currently selected authentication server to construct a "keyed one-way hash" of the password by applying a message-digesting algorithm.
Step 305. Combines the "keyed one-way hash" with the time stamp to compute a more secure hash value (the first hash value).

Note that the combination of the password with the service-specific seed makes it impossible to deduce what hash would be passed as authentication to other services. Furthermore, the combination of the time stamp and the "keyed one-way hash" makes the hash value (message digest) dynamic. In other words, the hash value is only valid for this current session. When the user logs on at a different time, the hash value will be different.

Step 306. Sends the user name, the time stamp and the hash value to the currently selected authentication server using one or more data packets as carrier.
Step 307. Receives a result of authentication from the authentication server. If the authentication is successful, proceeds to Step 308. If it is unsuccessful, proceeds to Step 309.
Step 308. Returns a successful authentication result to the client.
Step 309. Checks if there is an untested server in the list. If yes, then repeats steps 302–306 for a next authentication server selected from the remaining servers in the list.
Step 310. If no, returns an authentication failure message to the client.

In a situation where the client portion of the authentication system keeps an updated list of MCN participants but fails to keep updated IP addresses for each participant, the client 101 may start a Domain Name System (DNS) lookup process to obtain the IP address of the currently selected authentication server.

Figure 4:
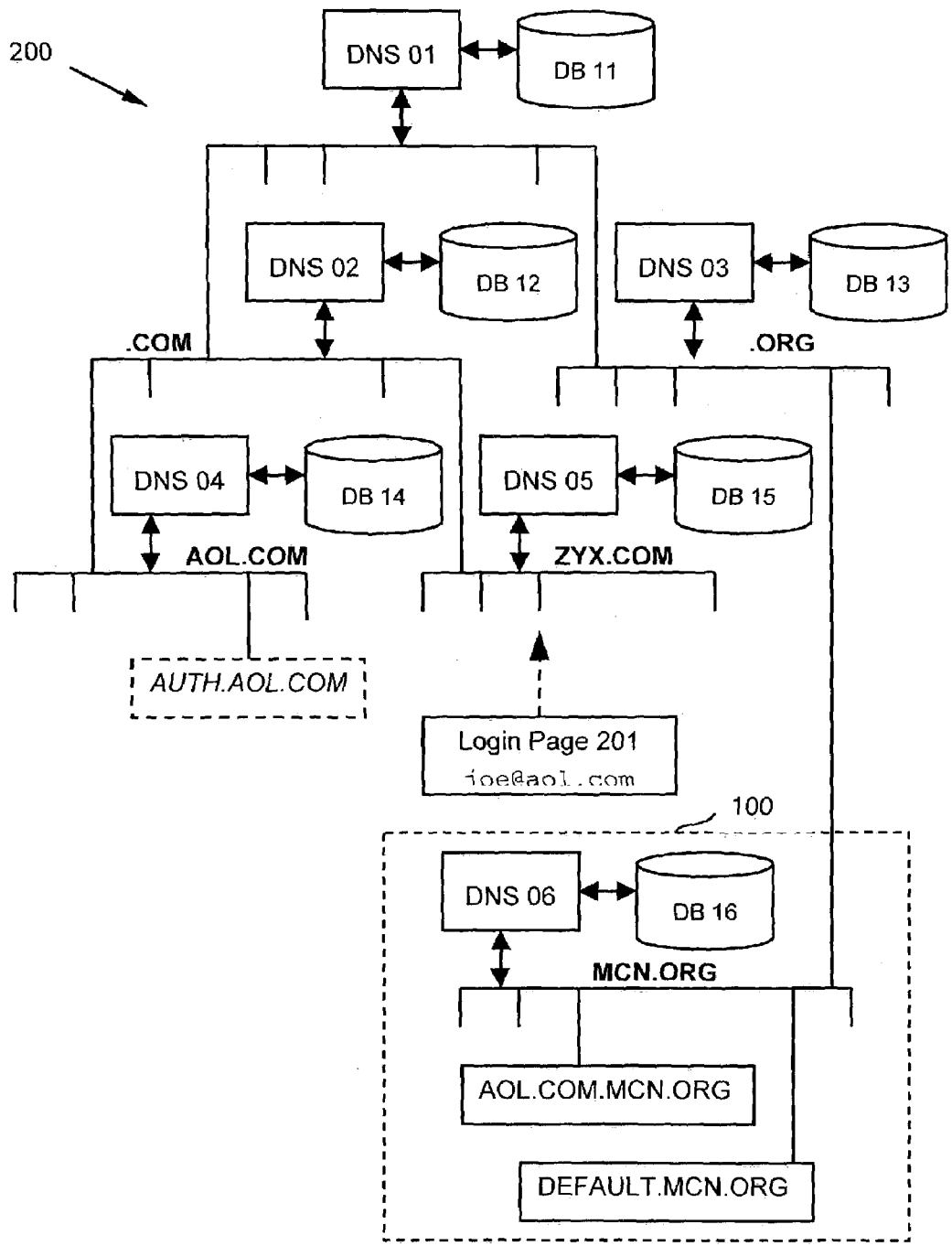
FIG. 4 is schematic diagram illustrating an exemplary domain name system, from which a client may obtain the IP address of an authentication server in case it fails to obtain the IP address from a local mapping list.

FIG. 4 illustrates is an exemplary domain name system 200 incorporated in a global network. A domain name system (DNS) is a general-purpose, replicated, distributed data query service for looking up host Internet Protocol (IP) addresses based on host names. It is hierarchical, consisting of domains, sub-domains, sites, and hosts. Unique names are formed from smallest to largest, and are of the form user@host.site.subdomain.domain, where host and site are often optional.

On the Internet, domain names typically end with a suffix denoting the type of site. For example, ".COM" for commercial sites and ".ORG" for organizations. A name resolution client, such as the client 101 in FIG. 1 and FIG. 2, can be configured to search for host information in the following order: first in the local/etc/hosts file, second in network information service (NIS), and third in DNS. This sequencing of naming services is sometimes called name service switching. DNS can be queried interactively using command nslookup.

The MCN network 100 illustrated in FIG. 1 is registered under a unique domain name, for example MCN.ORG, in the central location of the DNS 200. The MCN network 100 requires each participant to register its authentication server as an individual machine under the MCN domain. In other words, the hostnames of the authentication servers share a common suffix. For example, AOL, as a participant host, registers its authentication server as AOL.COM.MCN.ORG under the unique domain MCN.ORG. The domain name server DNS 06 associated with the MCN network 100 just treats each participant authentication server as a host machine. For example, it treats AOL.COM.MCN.ORG as the host name of AOL Authentication Server 101.

Figure 5:
FIG. 5 is a table diagram illustrating an IP address database associated with the domain name server in the network.

FIG. 5 illustrates a database DB 16 associated with the domain name server DNS 06. The database maintains a list of fully qualified domain names (FQDN) for the registered authentication servers. A FQDN consists of its local hostname and its domain name, including a top-level domain. For example, AOL.COM.MCN.ORG is a FQDN, in which AOL.COM is a host name, MCN.ORG is a domain name, and .COM is a top level domain name. Each of FQDN has a unique IP address, which was installed in the database DB 06 when a commercial participant of the federation registered its authentication server under the domain MCN.ORG.

When the IP address for the currently selected authentication server 111 is returned, the client 101 sends the secure hash value along with the user name and the time stamp to the currently selected authentication server 111. If the currently selected authentication server cannot authenticate the user, then the controller selects another candidate authentication server in the list and repeats the process as described above until the correct authentication server authenticates the user or all authentication servers fail to authenticate the user.

In an equally preferred embodiment, a user is required to input his global user identification (GUID) and password for authentication. A GUID is in a universal name space format, for example, an email address format. Hence any given GUID consists of two portions separated by a delimitation symbol, such as @. The first portion is the user's user name, and the second portion is a domain name indicating the domain of a server, such as AOL.COM, with which the user registered. For example, an AOL registered user with a user name, joe, should enter his GUID joe@AOL.COM and his password secret911 for authentication by AOL Authentication Server 111, which is registered as AOL.COM.MCN.ORG under the domain MCN.ORG.

Referring back to FIG. 4, assuming the user enters his GUID and password from a page 201 hosted by ZYX.COM. Once the user gets logged in, the client portion of the authentication system parses the user's GUID joe@AOL.COM and extracts the domain portion AOL.COM from the GUID. Then, it appends the MCN domain name as a suffix to the domain portion. As a result, a FQDN AOL.COM.MCN.ORG is formed.

The client portion of the authentication system first looks up a local domain name server DNS 05 to find location of the authentication server with a FQDN AOL.COM.MCN.ORG. After if fails in DNS 05, it populates the lookup request to its upper level DNS 02. After it fails in DNS 02, it populates the lookup request to the top DNS 01, where it locates the DNS 03 for the ".ORG" network. It further locates the DNS 06 for the MCN network 100 and eventually locates AOL.COM.MCN.ORG. In responding to the lookuyp request, the DNS returns a unique IP address for AOL.COM.MCN.ORG to the client 101. This unique IP address is automatically cached in the DNS along the returning route, i.e., DNS 06→DNS 03→DNS 01 DNS 02→DNS 05. Note that the critical point is that the DNS lookup is distributed and cached, and as a result, the DNS lookups cannot be centrally monitored by any participant of the federation.

The distributed authentication system embodied in the MCN network 100 may include a default server 114 with a FQDN DEFAULT.MCN.ORG. If the DNS lookup totally fails, i.e, the domain included in the lookup request sent by the client device 101 is not recognizaed by the DNS 200, a DNS resolver in the central location of the DNS 200 can automatically map the unrecognized domain to the default server 114. The default server 114 takes responsibility to authenticate the user by performing a hash process as described below (Process Performed By The Server Portion). The end result is that all possible MCN ID's are automatically distributed to the appropriate servers.

In another situation, all participants are not registered in a specific domain. Instead, each participating authentication server is registered with a standard server name in its main server's domain. For example, AOL Authentication Server 111 has a FQDN AUTH.AOL.COM, USPTO's authentication server has a FQDN AUTH.USPTO.GOV, etc. In other words, the host names of these authentication servers share a common prefix, but they reside in different domains. When the user gets logged in, the authentication system first parses and extracts the domain portion of the GUID. Then, it either checks a local mapping list or looks up the DNS 200 or performs both local list checkup and DNS lookup to locate the IP address for the target authentication server. If the IP address for the target authentication server is not found, the system may map the authentication request to the default server 114 as described above.

The DNS lookup process and the hash process can be performed sequentially or simultaneously. As soon as both the IP address and the hash value are available, the client sends the time stamp, the user's name, and the hash value to the authentication server 111 for authentication.

In the second preferred embodiment, because the authentication server is clearly identified by the GUID entered by the user, the authentication system does not need to iterate a list of authentication servers to find the correct one. It is slightly inconvenient for the user to type in his GUID, but the authentication process is much faster. In practice, the schemes in the first preferred embodiment and the second preferred embodiment can be combined. In other words, the authentication system can take either a regular user name such as "joe" or a GUID such as "joe@aol.com".

Process Performed by the Server Portion

When the authentication server 111 receives the authentication request from the client 101 in its I/O block 121*b*, it passes the request to the controller 122*a*. The controller 122*a* extracts the hash value, the user name and the time stamp from the received data packet or packets, and looks up the server's database DB 01 to check whether there is an entry for the user. If it finds an entry for the user, it retrieves the user's password stored in the database DB 01. Then, the controller combines the time stamp with the server's service seed and the retrieved password in the same specific logic order used in the client portion. It then passes the combination to the message digest computing engine 123*b*, which applies the same algorithm as used in the message-digest computing engine 123*a*, to the combination to generate a hash value. The controller 122*b* compares the resulted hash value with the received hash value from the client 101. If two hash values match, then the authentication is successful; otherwise, the server returns a failure message to the client.

Once the user is successfully authenticated, the authentication server returns an authentication token to the client and distributes the authentication result to other participating servers of the federation. The authentication token is cached in the client device. When the user sends request to any other participant servers, the authentication token is automatically attached. The attached authentication token is recognized by any participating server of the federation and is automatically cached in the participating server's database when the participating server receives the authentication token. In this way, the user's detailed authentication information is stored only in one participant server's authentication database, but the authentication token is distributed all over the participants' authentication databases. Because an authentication server does not need to store every user's detailed authentication information, its authentication database can be relatively small in size.

FIG. 6 is a flow chart illustrating an exemplary authentication process 400 performed in the server portion according to the invention. The process includes the steps of:

Step 401. The authentication server receives an authentication request carried by one or more data packets from the client. The authentication request includes the user name, the time stamp and the hash value.

Step 402. Extracts the hash value, the user name and the time stamp from the data packet or packets.

Step 403. Looks up its database to find an entry based on the user name. If the server finds an entry for the user, proceeds to Step 405; otherwise the system proceeds to step 404.

Step 404. Returns an authentication failure message to the client and the authentication process continues on the client portion.

Step 405. If the server finds an entry for the user, retrieves the user's password from the database.

Step 406. Combines the user name, the password and the server's service seed.

Step 407. Applies the hash algorithm to the combination.

Step 408. Compare the hash value from Step 407 (the second hash value) with the hash value received from the client (the first hash value). If two hash values don't match, proceeds to Step 404.

Step 409. If two hash values do match, returns a successful authentication message to the client.

Although the invention is described herein with reference to the preferred embodiment, one skilled in the art will readily appreciate that other applications may be substituted for those set forth herein without departing from the spirit and scope of the present invention.

Accordingly, the invention should only be limited by the Claims included below.

The invention claimed is:

1. In a computerized network comprising at least one client and a plurality of authentication servers, said client and said authentication servers being communicatively coupled to each other via a global telecommunications network, a method for providing distributed authentication service comprising said steps of:
   (a) taking and parsing, by said client, an entered user name and password;
   (b) generating a time stamp;
   (c) selecting an authentication server from a list of authentication servers;
   (d) combining said password and a service specific seed unique to an authentication server selected from said list of authentication servers;
   (e) applying a hash algorithm to said combination and said time stamp to generate a first hash value;
   (f) finding an address representing said selected authentication server;
   (g) sending a data packet to said selected authentication server, said data packet comprising said first hash value, said user name, and said time stamp;

(h) extracting said first hash value, said user name, and said time stamp from said data packet received from said client;
(i) checking whether an entry under said user name is available in said selected authentication server's database;
(j) if no entry under said user name is found, then returning a failure message to said client and repeating steps (b) to (g) for a next selected authentication server;
(k) if an entry under said user name is found, then retrieving said user's password;
(l) combining said time stamp, said retrieved password, and said service specific seed unique to said selected authentication server;
(m) applying said hash algorithm to said combination from Step (l) to generate a second hash value;
(n) comparing said first hash value and said second hash value;
(o) if said first hash value and said second hash value do not match, then returning a failure message to said client and repeating steps (b) to (g) for a next selected authentication server;
(p) if said first hash value and said second hash value match, then returning a successful authentication message to said client;
(q) caching and distributing said positive authentication result; and
(r) when said entire list has been tested and no one authenticates said user, then resulting in authentication failure.

2. The method of claim 1, wherein said hash algorithm is a message digesting (MD) algorithm or its equivalent.

3. The method of claim 1, wherein said service specific seed is a domain name of said selected authentication server.

4. The method of claim 1, wherein Step (f) further comprising said steps of:
(s) looking up a local mapping list; and
(t) if Step (s) fails, consulting to a domain name system (DNS).

5. In a computerized network which is registered with a unique domain name, said network comprising at least one orient and a plurality of authentication servers, said client and said authentication servers being communicatively coupled to each other via a global telecommunications network, each of said authentication servers having a fully qualified domain name which is a local host name with said unique domain name appended, a method for providing distilbuted authentication service, wherein a given user enters a global user identification (GUID) and a password for authentication to be carried out at a target authentication server, said GUID comprising a user name, a delimitation symbol, and a domain which is same as said local host name of said target authentication server, said method comprising said steps of:
(a) parsing, by said client, an entered GUID and password;
(b) generating a time stamp;
(c) extracting said user name from said GUID;
(d) extracting a domain from said GUID;
(e) combining said password and a service specific seed unique to said target authentication server;
(f) applying a hash algorithm to said combination and said time stamp to generate a first hash value;
(g) appending a unique domain name to said domain to form a fully qualified domain name (FQDN) for said target authentication server;
(h) looking up said FQDN from a local mapping list to obtain an address representing said target authentication server;
(i) if Step (h) fails, looking up said FQDN in a domain name system (DNS) to obtain an address representing said target authentication server;
(j) sending a data packet to said target authentication server, said data packet comprising said first hash value, said user name, and said time stamp;
(k) extracting said first hash value, said user name, and said time stamp from said data packet received from said client;
(l) checking whether an entry under said user name is available in said target authentication server's database;
(m) if no entry under said user name is found, then returning a failure message to said client;
(n) if an entry under said user name is found, then retrieving said user's password;
(o) combining said time stamp, said retrieved password and said service specific seed unique to said target authentication server;
(p) applying said hash algorithm to said combination from Step (o) to generate a second hash value;
(q) comparing said first hash value and said second hash value;
(r) if said first hash value and said second hash value do not match, then returning a failure message to said client;
(s) if said first hash value and said second hash value match, then returning a successful authentication message to said client; and (t) caching and distributing said positive authentication result.

6. The method of claim 5, further comprising said step of:
if Step (i) fails or if a failure message is returned from Step (m) or Step (r),
automatically mapping to a default server which carries out authentication on said user's authentication request.

7. The method of claim 5, wherein said hash algorithm is a message digesting (MD) algorithm or its equivalent.

8. The method of claim 5, wherein said service specific seed is a domain name of said target authentication server.

9. In a computerized network comprising at least one client end a plurality of authentication servers, said client and said authentication servers being communicatively coupled to each other via a global telecommunications network, a method fur providing distributed authentication service comprising said steps of:
(1) parsing a user's login information which includes a user ID and a password;
(2) if said entered user ID is a global user ID (GUID), proceeding to process A; and
(3) if said entered user ID is a regular user name, proceeding to process B; and
wherein said process A comprising said steps of:
(a) generating a time stamp;
(b) extracting said user's user name and a domain from said GUID;
(c) combining said password and a service specific seed unique to a target authentication server identified by said domain of said GUID;
(d) applying a hash algorithm to said combination and said time stamp to generate a first hash value;
(e) finding an IP address for said target authentication server;
(f) sending a data packet to said target authentication server, said data packet comprising said first hash value, said user name, and said time stamp;

(g) extracting said first hash value, said user name, and said time stamp from said data packet received from said client;
(h) checking whether an entry under said user name is available in said target authentication servers database;
(i) if no entry under said user name is found, then returning a failure message to said client;
(j) if an entry under said user name is found, then retrieving said user's password;
(k) combining said time stamp, said retrieved password, and said service specific seed unique to said target authentication server;
(l) applying said hash algorithm to said combination from Step (k) to generate a second hash value;
(m) comparing said first hash value and said second hash value;
(n) if said first hash value and said second hash value do not match, then returning a failure message to said client;
(o) if said first hash value and said second hash value match, then returning a successful authentication message to said client; and
(p) caching and distributing said positive authentication result; and wherein said process B comprising said steps of:
(aa) generating a time stamp;
(bb) selecting an authentication server from a list of authentication servers;
(cc) combining said password and a service specific seed unique to an authentication server selected from said list of authentication servers;
(dd) applying a hash algorithm to said combination and said time stamp to generate a first hash value;
(ee) finding an IP address representing said currently selected authentication server;
(ff) sending a data packet to said currently selected authentication server, said data packet comprising said first hash value, said user name, and said time stamp;

(gg) extracting said first hush value, said user name, and said time stamp from said date packet received from said client;
(hh) checking whether an entry under said user name is available in said currently selected authentication server's database;
(ii) if no entry under said user name is found, then returning a failure message to said client and repeating steps (aa) to (if) for a next selected authentication server;
(jj) if an entry under said user name is found, then retrieving said user's password;
(kk) combining said time stamp, said retrieved password and said service specific seed unique to said currently selected authentication server;
(ll) applying said hash algorithm to said combination from Step (kk) to generate a second hash value;
(mm) comparing said first hash value and said second hash value;
(nn) if said first hash value and said second hash value do not match, then returning a failure message to said client and repeating steps (aa) to (ff) for a next selected authentication server;
(oo) if said first hash value and said second hash value match, then returning a successful authentication message to said client; and (pp) caching and distributing said positive authentication result.

10. The method of claim 9, wherein said hash algorithm is a message digesting (MD) algorithm or its equivalent.

11. The method of claim 9, wherein any of Step (e) and Step (ee) further comprising said steps of:
(q) looking up a local mapping list; and
(r) if Step (q) fails, consulting to a domain name system (DNS).

* * * * *